United States Patent [19]
Clifford

[11] Patent Number: 5,251,524
[45] Date of Patent: Oct. 12, 1993

[54] CONVERTIBLE SIDING CUTTER

[76] Inventor: Leo D. Clifford, 10155 Greenbrier Rd., Minnetonka, Minn. 55343

[21] Appl. No.: 933,390

[22] Filed: Aug. 21, 1992

[51] Int. Cl.⁵ .................................................. B26D 1/30
[52] U.S. Cl. ........................................ 83/383; 83/384; 83/459; 83/462; 83/607; 83/920; 269/159
[58] Field of Search ................. 83/607, 459, 462, 384, 83/920, 383; 269/208, 159, 209

[56] References Cited

U.S. PATENT DOCUMENTS

| | | | |
|---|---|---|---|
| 979,079 | 12/1910 | McKenney | 269/159 X |
| 2,254,374 | 9/1941 | Laukhuff | 83/607 X |
| 3,134,285 | 5/1964 | Greene | 83/467 |
| 3,393,595 | 7/1968 | Halverson et al. | 83/580 |
| 3,714,856 | 2/1973 | Hall et al. | 83/453 |
| 4,130,037 | 12/1978 | Matthews | 83/56 |
| 4,401,002 | 8/1983 | Worsham | 83/609 X |
| 4,510,834 | 4/1985 | Greene et al. | 83/453 |
| 5,010,795 | 4/1991 | Kania | 83/611 X |
| 5,038,477 | 8/1991 | Parrow | 30/253 |

FOREIGN PATENT DOCUMENTS 4365 12/1891 Switzerland ........................ 269/209

Primary Examiner—Frank T. Yost
Assistant Examiner—Kenneth E. Peterson
Attorney, Agent, or Firm—John W. Bunch

[57] ABSTRACT

A convertible siding cutter (10) for cutting vinyl or metal siding, comprises an upper knife assembly (26) pivoted to the front one of a plurality of lower knife assemblies (36, 46) mounted on a base (20). The blade (28) in the upper knife assembly (26) can be interchanged with other blades, and an auxiliary lower knife assembly (58) can be used for conversion to accommodate different sizes and types of siding. A safety clamp assembly (64) is also provided to help keep the user's hands away from the blades when using the cutter (10).

18 Claims, 5 Drawing Sheets

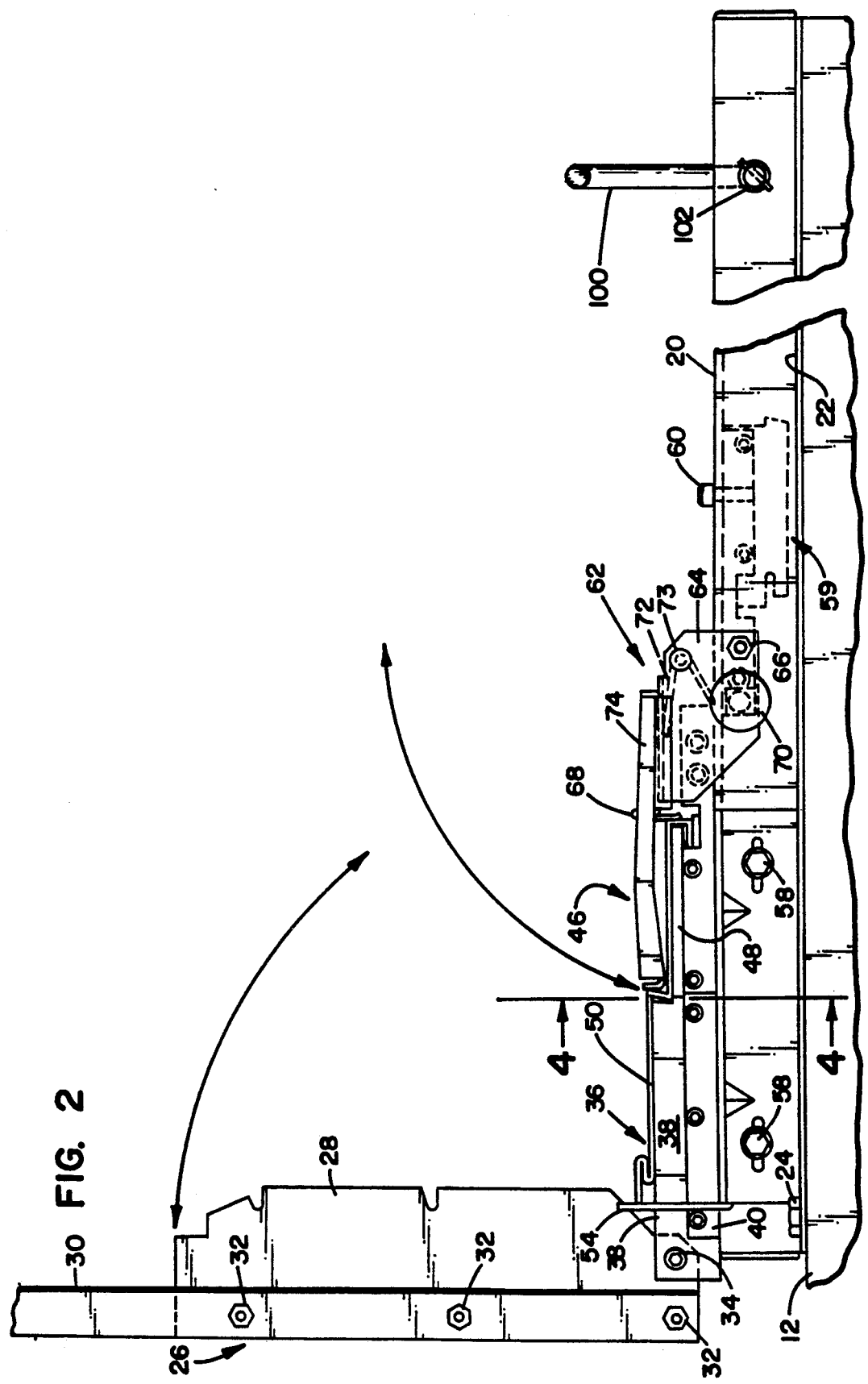

CONVERTIBLE SIDING CUTTER

TECHNICAL FIELD

The present invention relates generally to cutting devices of the shear type. More particularly, this invention concerns a siding cutter which is safer to use and which is readily convertible to accommodate different sizes and types of siding.

BACKGROUND ART

Aluminum, steel, or vinyl siding is often used to cover the exteriors of buildings. Such siding takes the general form of preformed sections adapted to interlock at their top and bottom edges with complementary edges on adjacent sections. The top edge of such siding typically has holes therein for nailing purposes and a downwardly turned lip on the outer surface. The bottom edge typically includes an upwardly turned lip on the inner surface. An intermediate bend or lap is sometimes provided to give the appearance of two relatively narrow overlapping strips of siding, which can be smooth or textured. Such siding is typically installed on a wall from the bottom up, one course at a time, by cutting into sections of the required length, interfitting the bottom edge of one section to the top edge of the previous section, nailing the top edge of that one section in place, cutting the next section to length, etc.

In the past, such siding has been cut to length with tin snips, hacksaws, and the like. This is time consuming and can substantially increase the cost of installation. Cutting the steel siding with a saw can remove any galvanizing, paint or other protective coating, and void the siding manufacturer's warranty. In addition, cutting with hand tools of this type is not especially precise and can cause warpage or distortions in otherwise smooth siding, which in turn can lead to difficulties in installation and increase exposure to injury by the user.

Siding cutters also have been available heretofore for this purpose. For example, U.S. Pat. Nos. 5,038,477 to Parrow, 4,510,834 and 3,134,285 to Greene, 4,401,002 to Worsham, 4,130,037 to Matthews, and 3,393,595 to Halverson are representative of the prior art in this regard. Although such cutters have been available, they have had certain drawbacks. For example, the siding cutters of the prior art are not readily convertible to accommodate different types and sizes of siding, and may in some instances not be configured in the safest manner for the user.

A need has thus arisen for an improved siding cutter which is readily convertible to accommodate different types and sizes of siding, and which is safer to operate.

SUMMARY OF INVENTION

The present invention comprises a convertible siding cutter which overcomes the foregoing and other difficulties associated with the prior art. In accordance with the invention, there is provided a convertible siding cutter including a pivotal upper knife assembly, and a plurality of lower knife assemblies secured to a base. The lower knife assemblies can be arranged end-to-end as necessary to accommodate the particular size and type of siding being cut. In addition, a safety clamp assembly is provided in association with the lower knife assemblies to hold the siding firmly in position as it is being cut. The safety clamp assembly must be selectively locked and unlocked and is adapted for actuation with one hand, while the upper knife assembly is adapted for actuation by the other hand, in order to help keep the user's hands away from the knife assemblies and thus improve safety during operation.

BRIEF DESCRIPTION OF DRAWINGS

A better understanding of the invention can be had by reference to the following Detailed Description in conjunction with the accompanying Drawings, wherein:

FIG. 2 is an enlarged side view of the siding cutter herein, shown with the upper knife assembly open and the safety clamp assembly closed or a section of siding being cut;

DETAILED DESCRIPTION

Figure 1:
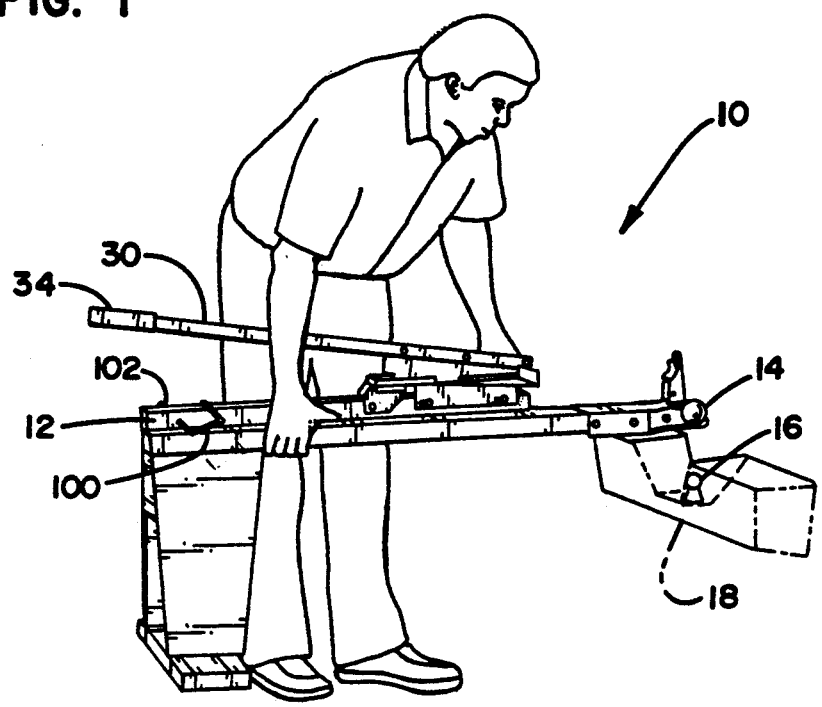
FIG. 1 is a perspective view of the convertible siding cutter of the invention, mounted on an optional caddy for attachment to a hitch.
Figure 5:
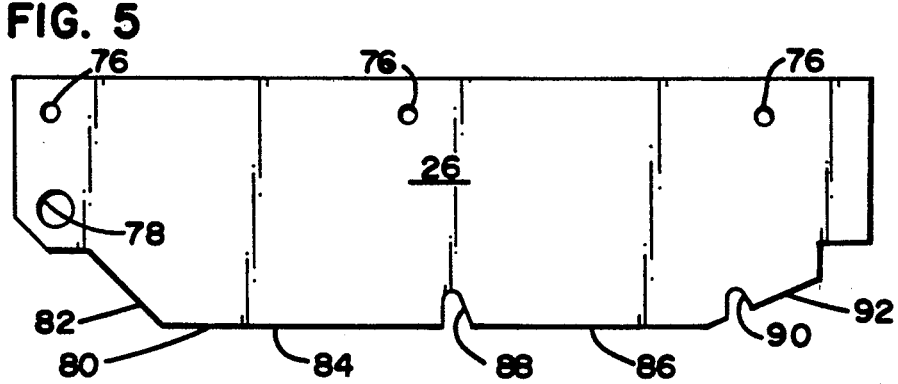
FIGS. 5-8 are side views of alternate blade configurations for the upper knife assembly.
Figure 6:
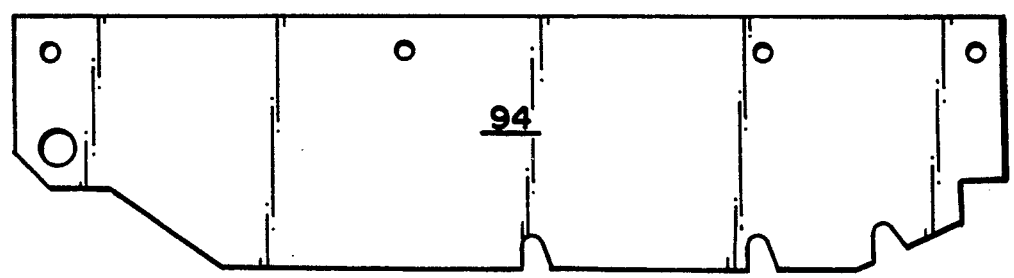

Referring now to the Drawings, wherein like reference numerals designate like or corresponding elements throughout the views, and particularly referring to FIG. 1, there is shown the convertible siding cutter 10 incorporating the invention. The siding cutter 10 is shown mounted on an optional caddy 12 which can be secured with a hitch 14 to a ball 16 on the bumper 18 of a pick up truck or other vehicle (not shown). The optional caddy 12 takes the general form of a half saw horse. It will be understood, however, that the siding cutter 10 can be set up on any suitable support stand or table. As will be explained more fully hereinafter, the siding cutter 10 incorporates a plurality of lower knife assemblies for convenient conversion to accommodate different sizes and types of siding, as well as certain features to improve safety during use.

Although the convertible cutter 10 herein is particularly suited for use with siding, it can also be adapted for cutting soffits.

The siding cutter 10 includes a base 20 which takes the form of an inverted channel section having opposite longitudinal side flanges 22. The base 20 is secured to the caddy 12, or other suitable underlying support stand or table, by bolts 24 extending through the side flanges 22.

Referring now to FIG. 2, the convertible side cutter 10 also includes upper and lower knife assemblies. In particular, the upper knife assembly 26 includes a straight blade 28 and a handle 30. In accordance with the preferred construction, the handle 30 comprises a pair of elongate bars clamped over the upper edge of the blade 28 by through fasteners 32. The fasteners preferably comprise nuts and bolts to facilitate removal and/or replacement of the blade 28 as necessary. A cushion grip 34 is secured over the outer end of the handle 30, as is best seen in FIG. 1. The inner end of the upper knife assembly 26 is pivotally connected at the inner end of blade 28 by a bolt 34 to the lower knife assemblies. It will thus be appreciated that the upper knife assembly 26 pivots relative to the lower knife assemblies.

A plurality of precision lower knife assemblies are aligned and mounted on the base 20. Each such lower knife assembly includes a pair of fixed blades mounted on blocks which are secured together so as to maintain precise spacing between the blades for receiving the moving blade 28 of the upper knife assembly 26 therein for a clean shearing action. In particular, a lower front knife assembly 36 includes a pair of blades 38 secured to the inside surfaces of opposing blocks 40 which are secured together by transverse fasteners 42 and spacers 44 in order to define a narrow slot for receiving the upper blade 28 therebetween. The lower knife assembly 36 is secured to the bas 20 by bolts 46.

Another lower knife assembly 48 is mounted o the base 20 immediately behind and in alignment with the knife assembly 36. The lower rear knife assembly 46 also includes a pair of blades secured to the inside surfaces of opposing support blocks secured together in precise spaced arrangement by transverse fasteners and spacers as in the case of the lower front knife assembly 36. However, the blades 48 in the lower rear knife assembly 46 are relatively shorter in height, in order to form a step with the blades 38 in the front knife assembly 36 to receive a section of lapped siding 50 thereon, and are also notched or undercut at the rear in order to receive the lower lip of the siding 50 as is best seen in FIG. 2.

It will thus be appreciated that the lower knife assemblies 36 and 46 are secured in precise aligned relationship to define a slot for receiving the blade on the upper knife assembly 26. Further, the upper edges of the blades 38 and 48 in the respective lower knife assemblies 36 and 46 are generally configured in order to receive a section of siding thereon.

Lateral extensions 52 are also secured to the base 20 on opposite sides of the lower knife assemblies 36 and 46 for adjustably supporting the section of siding 50 thereon. Each extension 52 includes an upstanding front edge 54 which serves as a locating surface for the top edge of the siding 50, as well as a generally flat top surface 56. Each extension 52 is secured to the base 20 by bolts 58 extending through longitudinal slots therein for adjustability as is best seen in FIG. 2.

In addition to the front and rear lower knife assemblies 36 and 46, the convertible siding cutter 10 preferably includes an auxiliary knife assembly 59 for accommodating other sizes or types of siding. The auxiliary knife assembly 59 also includes a pair of blades (notched or undercut at the rear) secured together in precise spaced relationship by transverse fasteners and spacers, similar to lower rear knife assembly 46. The auxiliary knife assembly 59 can be stowed in a hidden position inside one end of the base 20 as shown in dotted lines in FIGS. 2 and 3, although it is readily available for use by releasing fasteners 60. The auxiliary knife assembly 56 would be used, for example, on top of the rear knife assembly 46 in order to convert the cutter 10 from "double four" or "double five" siding to "straight eight" siding. Mounting holes 61 are provided in the top of the lower rear knife assembly 46 for attaching the auxiliary knife assembly 56 thereto. This comprises an important feature of the present invention.

Figure 3:
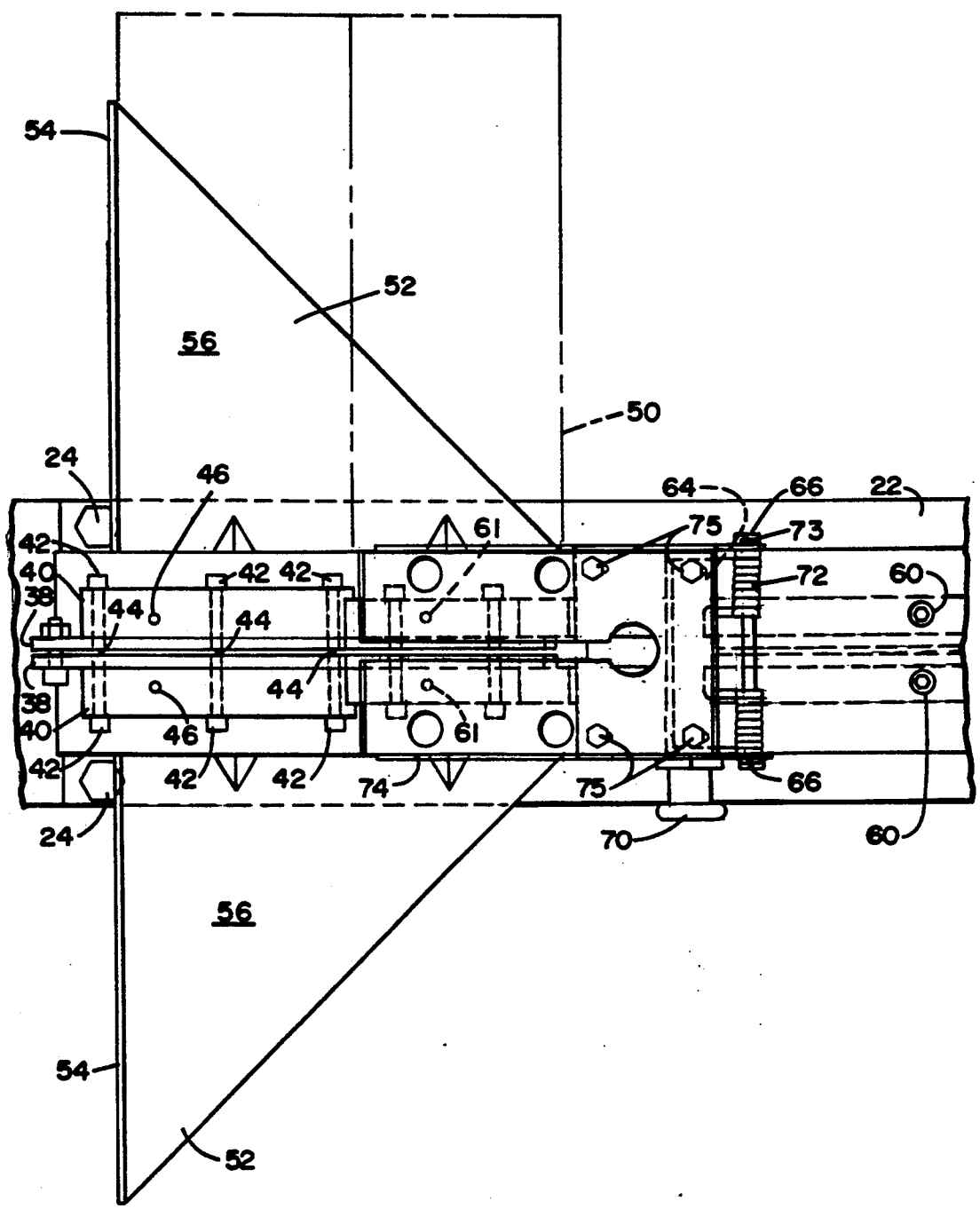
FIG. 3 is an enlarged partial top view of the siding cutter herein, with the upper knife assembly removed for clarity.
Figure 7:
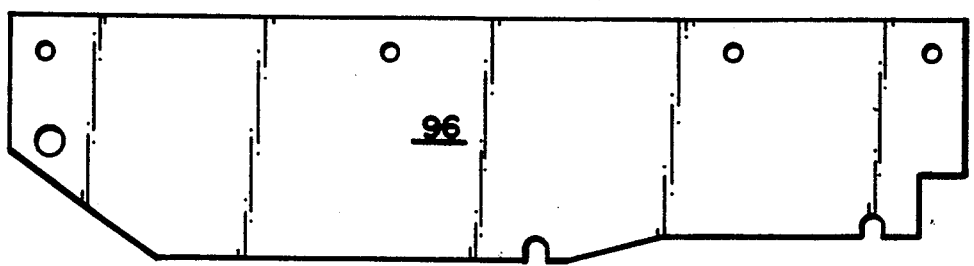
Figure 8:
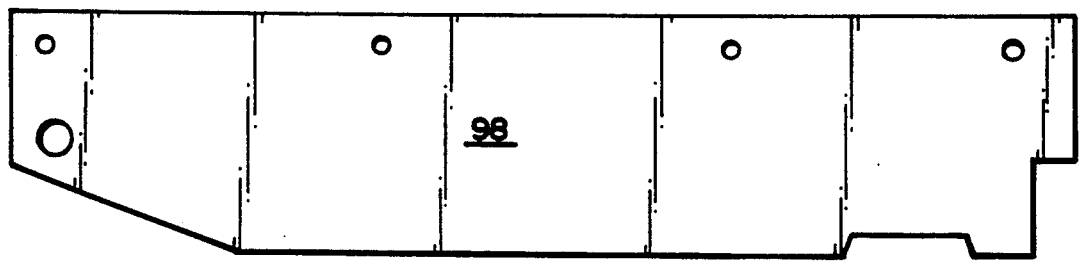
Figure 4:
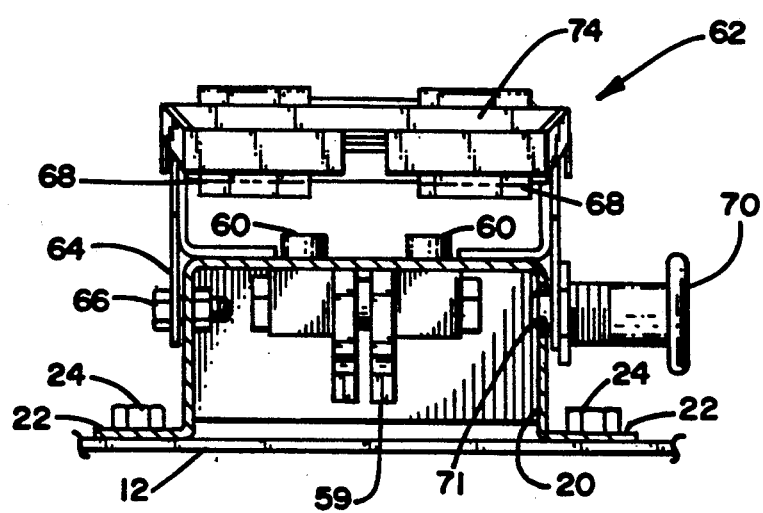
FIG. 4 is a sectional view taken along lines 4—4 of FIG. 2 in the direction of the arrows.

Referring to FIGS. 2-4, the siding cutter 10 further includes a safety clamp assembly 62 which operates in conjunction with the lower knife assemblies 36 and 46 and extensions 52 in order to releasably secure the siding 50 in place during cutting. The safety clamp assembly 62 includes a plate 64 pinned to the base 20 by bolts 66 for pivotal movement between the down and locked position shown in solid lines and the raised position shown in phantom lines. The plate 64 is of generally inverted U-shape in order to straddle base 20 at the rear of the knife assembly 46. The top of plate 64 is notched as best seen in FIG. 3, for clearance with the rear end of the blade 28 on the upper knife assembly 26. The plate 64 preferably includes a pair of spaced apart downwardly turned front edges 68 for engaging the bottom edge of the siding 50 as is best seen in FIGS. 2 and 4. A manual spring detent pin 70 is provided on one side of the plate 64 for selective engagement with a hole 71 in the side of base 20. The end of the plunger in the spring pin 70 and the portion of base 20 adjacent the hole 71 are preferably configured so that the spring pin must be manually actuated by the user to either lock or release the safety clamp assembly 62. The spring pin 70 is shown on the left side of plate 64, however it could be located on either the left or right side. This also comprises a significant feature of the present invention because it requires operation by one hand of the user away from the blades, while the other hand is operating the movable knife assembly 26.

In accordance with the preferred construction, the safety clamp assembly 62 is normally biased toward the raised position by assist spring 72 surrounding rod 73 extending between the sides of plate 64. Spring 72 assists in opening the safety clamp assembly 62 for faster operation of the siding cutter 10. When in the normal raised position, it also prevents the handle 30 from being lowered, until the assembly 62 is down and locked, for safety purposes. This is another important feature of the present invention.

If desired, an optional extension 74 can be secured by bolts 75 to the top of plate 64 for holding down the siding 50 as it is being cut. The extension 74 is preferably slotted as shown for adjustment with bolts 75.

FIGS. 5-8 show various blade configurations for the upper knife assembly 26. Each blade includes a series of mounting holes along the top edge for securing it to the handle 30, as well as another relatively larger mounting hole at the lower front end for pivotally securing it to the lower front knife assembly 36. Each blade is adapted for use with a particular size and/or type of siding. For example the blade 26 shown in FIG. 5, can be used with "double four" and "straight eight" siding. The blade 26 includes handle mounting holes 76, a pivot mounting hole 78, and a lower cutting edge 80. The cutting edge 80 includes an inclined portion 82 for cleanly cutting through the flat folds at the top edge of the siding 50, straight portions 84 and 86 for cutting through the relatively flat single thickness portions of the siding, notches 88 and 90 and a declined portion 92 for cutting through the middle laps and lower lips at the bottom edge of the siding. The blade 94 shown in FIG. 6, can be used with "double five" or "straight eight" siding. The blade 96 in FIG. 7 ca be used with "dutch lap double five" siding, while the blade 98 in FIG. 8 can be used with "straight 12 vertical lap" siding. The lower edges of each of the blades 94, 96 and 98 are accordingly configured for cleanly cutting through the various portions of the particular siding without bending the siding while doing so.

If desired, a latch 100 can be provided for securing the handle 30 down for convenience in carrying the cutter 10. The latch 100 includes a J-shaped bail which is freely movable in a pivotal direction, as well as in a lateral direction under the action of spring 102, so that it can be readily moved into and out of latching engagement with the handle 30.

Figure 9:
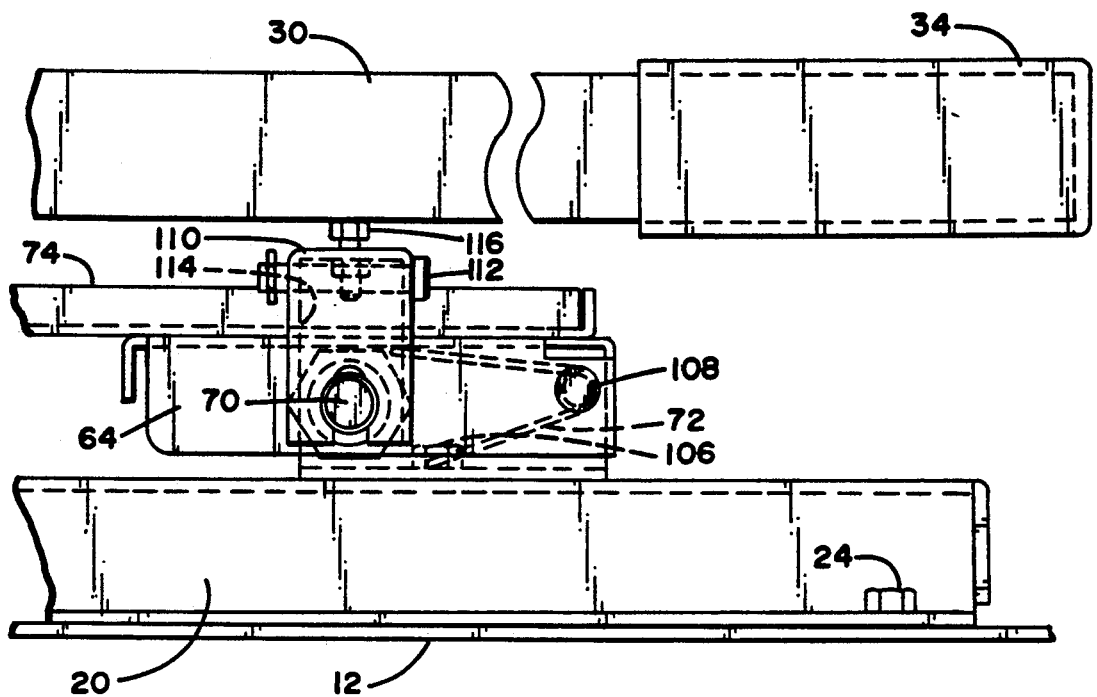
FIG. 9 is a side view of a modified safety clamp assembly.
Figure 10:
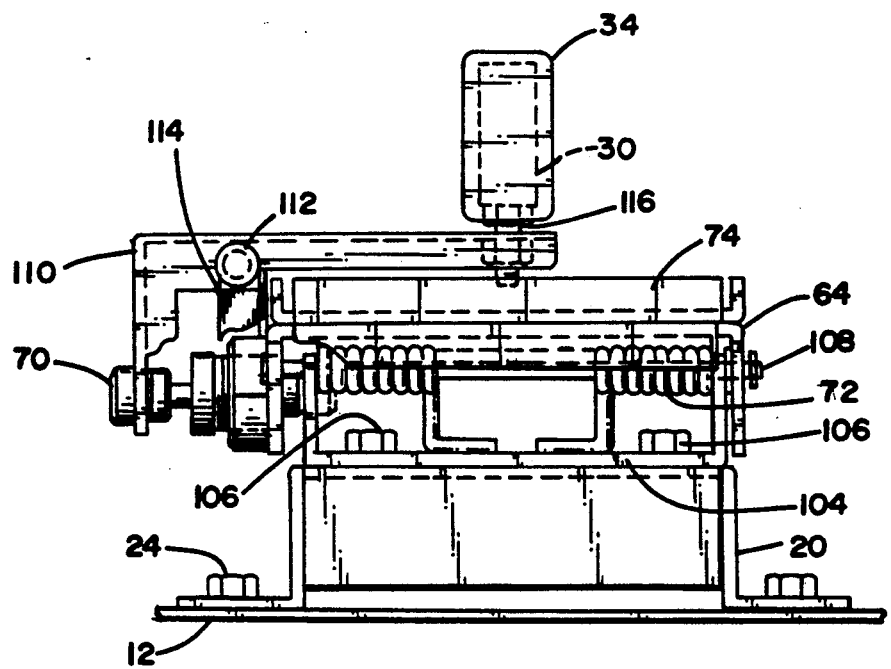
FIG. 10 is an end view thereof.

FIGS. 9 and 10 show a modification of the safety clamp assembly 62. Instead of being mounted directly on base 20, the plate 64 is secured to a raised base plate 104 by bolts 106 extending through slots so that the entire assembly 62 can be adjusted as necessary with the same extension 74, instead of changing the extension. The pin or rod 108 takes the place of bolts 66 and rod 73. The outer end of the spring detent pin 70 is connected to one end of a pivotal actuator arm 110 supported by pin 112 and bracket 114. The bracket 114 is secured to plate 64. The other end of the actuator arm 110 extends beneath the handle 30 for engagement so as to release the detent pin 70 automatically after the handle is lowered to make a cut, after which the safety clamp assembly 62 is automatically opened by spring 72 upon raising the handle. An adjustment screw 116 is preferably provided for adjusting contact between the handle 30 and actuator arm. Manual actuation is still required by the user to close and lock the assembly 62, however, this modification allows for automatic release so that the cutter 10 can be operated more quickly for more productivity without compromising safety.

From the foregoing, it will thus be apparent that the present invention comprises an improved siding cutter having numerous advantages over prior art. The siding cutter herein can easily be converted for use with various sizes and types of siding, and includes a releasable safety clamp assembly which helps to keep the users hands away from the blades. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A convertible siding cutter, which comprises:
a base;
front and rear lower knife assemblies secured in aligned end-to-end relationship to said base, each of said front and rear lower knife assemblies including front and rear ends and a pair of opposing blades secured in fixed predetermined spaced apart relationship;
an upper knife assembly, said upper knife assembly including a blade and a handle;
means located at the front end of said front lower knife assembly for pivotally supporting said upper knife assembly for pivotal movement between a raised position and a lowered position with the blade of said upper knife assembly extending between the blades of said lower knife assemblies;
safety catch means for selectively holding a section of siding in place on said lower knife assemblies during cutting, the rear end of said rear lower knife assembly being undercut so as to receive a lip extending along an edge of the siding to be cut;
means located at the rear end of said rear lower knife assembly for pivotally supporting said safety catch means for pivotal movement between a raised position and a lowered position in engagement with the siding being cut;
spring detent means for releasably securing said safety catch means in the lowered position; and
means for normally biasing said safety catch means towards the raised position.

2. The convertible siding cutting of claim 1, wherein said base comprises an inverted channel section having outwardly turned longitudinal side flanges.

3. The convertible siding cutter of claim 1, wherein the blades of each of said front and rear lower knife assemblies are secured to longitudinal mounting blocks secured together by a plurality of transverse fasteners and spacers.

4. The convertible siding cutter of claim 1, further including:
an auxiliary lower knife assembly adapted to be secured to at least one of said front and rear lower knife assemblies in order to convert the siding cutting for use with siding of a different predetermined profile.

5. The convertible siding cutter of claim 1, wherein said means for pivotally supporting said upper knife assembly on said base includes a bolt extending through aligned holes in the blades of said upper knife assembly and said front lower knife assembly.

6. The convertible siding cutter of claim 1, wherein the blades on said lower knife assemblies include substantially straight upper cutting edges positioned at different relative heights in order to conform to double lap type siding.

7. The convertible siding cutter of claim 1, wherein the blade of said upper knife assembly includes a lower cutting edge with straight portions separated by notches therein configured in accordance with the type of siding being cut.

8. The convertible siding cutter of claim 1, further including:
lateral extension means associated with said lower knife assemblies for supporting the siding thereon during cutting.

9. A convertible siding cutter, which comprises:
a base;
front and rear lower knife assemblies secured in aligned end-to-end relationship to said base, each of said front and rear lower knife assemblies including a pair of opposing blades secured in fixed predetermined spaced apart relationship;
an upper knife assembly, said upper knife assembly including a blade and a handle;
means for pivotally supporting said upper knife assembly on said base for pivotal movement between a raised position and a lowered position with the blade of said upper knife assembly extending between the blades of said lower knife assemblies;
safety catch means pivotally secured to said base for selectively holding a section of siding in place on said lower knife assemblies during cutting, said safety catch means being movable between a raised position and a lowered position in engagement with the siding being cut;
spring detent means for releasably securing said safety catch means in the lowered position;
means responsive to movement of said upper knife assembly to the lowered position for releasing said spring detent means; and
means for normally biasing said safety catch means towards the raised position.

10. A convertible siding cutter, which comprises:
a base;

front and rear lower knife assemblies secured in aligned, end-to-end relationship to said base, each of said lower knife assemblies including front and rear ends and a pair of cutting blades secured in fixed predetermined spaced-part relationship;

an upper knife assembly, said upper knife assembly including a cutting blade and a handle;

means for securing said upper knife assembly to the front end of said front lower knife assembly for pivotal movement between a raised position and a lowered position with the blade of said upper knife assembly extending between the blades of said lower knife assemblies;

safety catch means for selectively holding a section of siding in place on said lower knife assemblies during cutting, the rear end of said rear lower knife assembly being undercut so as to receive a lip extending along an edge of the siding to be cut;

means located at the rear end of said rear lower knife assembly for supporting said safety catch means for pivotal movement between downward engaged and upward disengaged positions relative to a section of siding positioned in the cutter; and means responsive to movement of said handle for selectively locking said safety catch means in a downward position engaged with the section of siding being cut.

11. The convertible siding cutter of claim 11, further including:

means for selectively securing the handle of said upper knife assembly in the lowered position.

12. The convertible siding cutter of claim 11, wherein the blades of each of said front and rear lower knife assemblies are secured to longitudinal mounting blocks secured together by a plurality of transverse fasteners and spacers.

13. The convertible siding cutter of claim 11, further including:

means for normally biasing said safety catch means towards the upward disengaged position.

14. The convertible siding cutter of claim 11, wherein said means for pivotally supporting said upper knife assembly on said base includes a bolt extending through aligned holes in the blades of said upper knife assembly and said front lower knife assembly.

15. The convertible siding cutter of claim 11, wherein the blades on said lower knife assemblies include substantially straight upper cutting edges positioned at different relative heights in order to conform to double lap type siding.

16. The convertible siding cutter of claim 11, wherein the blade of said upper knife assembly includes a lower cutting edge with straight portions and a plurality of predetermined notches arranged according to the configuration of siding being cut.

17. The convertible siding cutter of claim 11, further including:

lateral extension means associated with said lower knife assemblies for supporting the siding thereon during cutting.

18. The convertible siding cutter of claim 11, further including:

an auxiliary lower knife assembly adapted to be secured to at least one of said front and rear lower knife assemblies in order to convert the siding cutting for use with siding of a different predetermined profile.

* * * * *